US006793818B1

(12) United States Patent
Entringer et al.

(10) Patent No.: US 6,793,818 B1
(45) Date of Patent: Sep. 21, 2004

(54) SUPPORT AND LOCKING STRUCTURE FOR A FUEL FILTER

(75) Inventors: David C. Entringer, Wautoma, WI (US); John M. Rath, Hartford, WI (US)

(73) Assignee: Brunswick Corporation, Lake Forest, IL (US)

( * ) Notice: Subject to any disclaimer, the term of this patent is extended or adjusted under 35 U.S.C. 154(b) by 100 days.

(21) Appl. No.: 10/174,710

(22) Filed: Jun. 19, 2002

(51) Int. Cl.[7] .......................... B01D 27/00; B01D 27/08
(52) U.S. Cl. ...................... 210/238; 210/232; 210/435; 210/443; 210/DIG. 17
(58) Field of Search .................... 210/232, 238, 210/435, 438, 439, 440, 443, DIG. 17

(56) References Cited

U.S. PATENT DOCUMENTS

| 4,502,956 A | 3/1985 | Wilson et al. ............... 210/248 |
| 5,236,579 A | 8/1993 | Janik et al. .................... 210/94 |
| 5,259,953 A | * 11/1993 | Baracchi et al. ............ 210/232 |
| 5,904,844 A | 5/1999 | Stone .......................... 210/232 |
| 5,908,020 A | 6/1999 | Boutwell et al. ........... 123/541 |
| 6,607,665 B2 | * 8/2003 | Fick et al. ................... 210/238 |

* cited by examiner

Primary Examiner—David A. Reifsnyder
(74) Attorney, Agent, or Firm—William D. Lanyi (57) ABSTRACT

A supporting structure for a fuel filter assembly provides a latch which is manually movable without the necessity of tooling into either a locking position or an unlocking position. By manually moving the latch, a collar of the fuel filter assembly can be freed to rotate about a supporting cover so that the reservoir can be removed. The assembly can also be manually removed from a support bracket without the use of tooling. The fuel filter assembly provides a resilient mounting system that isolates the fuel filter and its associated components from the vibrations that are inherent in an internal combustion engine.

31 Claims, 7 Drawing Sheets

SUPPORT AND LOCKING STRUCTURE FOR A FUEL FILTER

BACKGROUND OF THE INVENTION

1. Field of the Invention

The present invention is generally related to a support structure for a fuel filter and, more particularly, to a mechanism that allows a fuel filter assembly to be locked in place, or unlocked for removal, without the need for tools.

2. Description of the Prior Art

Many different types of fuel filters and related assemblies are known to those skilled in the art for use in conjunction with fuel delivery systems of internal combustion engines. Typically, a fuel filter is provided in a container, or reservoir, and liquid fuel is introduced into the reservoir, passed through the fuel filter, and conducted to the engine. Some fuel filters are constructed to separate water from the fuel in addition to removing solid impurities and debris from the stream of liquid fuel being conducted from a fuel tank to the engine.

U.S. Pat. No. 5,236,579, which issued to Janik et al on Aug. 17, 1993, describes a fuel filter assembly with a modular drain bowl. The assembly incorporates a modular drain bowl which may be removably mounted at the lower end of the disposable filter cartridge. An anchor insert is disposed interiorly at the lower portion of the cartridge sump for anchoring a fastener to attach the drain bowl. The insert is also specially configured to form outlet passages which facilitate the flow of water from the sump to the drain bowl.

U.S. Pat. No. 4,502,956, which issued to Wilson et al on Mar. 5, 1985, describes a fuel filter assembly in which a filter cartridge, threadedly supported from a mounted unit, engages and supports a contaminant collection bowl having a plurality of collection zones respectively upstream and downstream of fuel treatment means within the cartridge. In general, a dual media filter element includes a flow passage axially thereof with means at one end for carrying the fuel element from a support head, and means on the other for supporting a contaminant collection bowl beneath. A primer pump disposed axially of the filter element moves between advanced and retracted positions therealong.

U.S. Pat. No. 5,904,844, which issued to Stone on May 18, 1999, describes a fuel filter element. A fuel filter assembly for filtering diesel fuel includes a filter head, a spin-on replaceable element and a collection bowl removable from the element. The element includes a casing with a turned-in edge portion at a lower end. An adapter ring is supported on the edge portion inside the element and includes an annular threaded portion. The collection bowl has an outer peripheral wall with an annular threaded portion engaging the threaded portion of the adaptor ring. The outer peripheral wall of the bowl has an annular shoulder abutting the turned-in edge portion of the casing to clamp the casing between the adaptor ring and the bowl, when the bowl is attached to the element. The adaptor ring has a plurality of space ribs with projections that extend upwardly and radially outward to maintain the filter medium spaced from an inner wall surface of the casing. A resilient member holds the filter medium between a top plate and the adaptor ring.

U.S. Pat. No. 5,908,020, which issued to Boutwell et al on Jun. 1, 1999, describes a marine fuel pump and cooling system. An integrated fuel system component comprising a fuel pump, a fuel filter axially mounted directly below and around the lower portion of the fuel pump, and a spiral wound fuel line composed of a heat conductive material mounted concentric to the upper portion of the fuel pump, minimizes the space required for the installation. A fuel cooling system encloses the pump housing and the fuel line in sealed chambers through which a liquid coolant is circulated to cool both the fuel pump and the fuel contained within the fuel line. A fuel pressure regulator located between the fuel line and a fuel outlet returns fuel to a fuel reservoir located below the fuel filter, thereby providing a closed loop system. By combining the fuel pump, the fuel filter, liquid cooling system, and pressure regulator into a single unit, the integrated unit minimizes vapor lock induced by heat, and optimally houses the fuel system components within a minimal volume of space.

The patents described above are hereby expressly incorporated by reference in the description of the present invention.

SUMMARY OF THE INVENTION

A reservoir support structure, made in accordance with the preferred embodiment of the present invention, comprises a supporting cover which is attachable to an object, such as an engine. It also comprises a collar which is attachable to the supporting cover and which has a central opening formed through it and shaped to receive the reservoir therein. The collar is attachable to the supporting cover by rotating the collar relative to the supporting cover. In other words, the reservoir is disposed through the central opening of the collar and the collar is attached to the support cover to capture the upper portion of the reservoir therebetween. The present invention also comprises a protrusion extending from the supporting cover. Although a preferred embodiment of the present invention provides two posts that serve as the protrusion, it should be understood that a single protrusion could also be used. A latch is attached to the supporting cover and configured to slide relative to the protrusion and the supporting cover. The latch is movable into a locking position and also movable into an unlocking position. The latch is shaped to inhibit rotation of the collar relative to the supporting cover when the latch is in the locking position and to allow rotation of the collar relative to the supporting cover when the latch is in the unlocking position.

The present invention further comprises a support bracket which is attachable to the supporting cover and to the object, such as the internal combustion engine, for attaching the supporting cover to the object. The support bracket is resiliently attached to the supporting cover and the supporting cover is detachable from the support bracket by exerting a force on the supporting cover in a preselected direction away from the support bracket.

As described above, the protrusion can comprise two posts that extend from the supporting cover and the latch can comprise a slot which is formed through its thickness. The slot is shaped to receive the protrusion therein. The slot is also shaped to be releasably restrained by a first position of the protrusion when the latch is in the locking position and to be releasably restrained by a second portion of the protrusion when the latch is in the unlocking position.

The collar is shaped to have a plurality of discontinuities extending from its periphery. The latch comprises a locking portion that is shaped to be captured between two adjacent ones of the plurality of discontinuities with the latch is in the locking position in certain embodiments of the present invention. The locking portion of the latch can also be shaped to capture one of the pluralities of discontinuities within an interstitial gap that is formed in the locking portion when the latch is in the locking position, in certain embodiments of the present invention.

The reservoir can be disposed within the central opening of the collar and attached to the supporting cover. A fuel filter is disposed within the reservoir, and, in certain embodiments, a water sensor if formed within the body of the reservoir to detect the presence of water at the bottom portion of the reservoir.

A particularly preferred embodiment of the present invention further comprises an inlet passage formed in the supporting cover to conduct liquid fuel through the supporting cover and an outlet passage formed in the supporting cover to conduct liquid fuel through the supporting cover.

For convenience, certain embodiments of the present invention provide a supporting cover that is threaded and a collar which is threaded so that they can be attached to each other in threaded association. The cover is threaded with male threads and the collar is threaded with female threads in a preferred embodiment. When the latch is moved into the locking position, the collar is prevented from rotating about a central axis and the reservoir is therefore held in place and prevented from being removed from the supporting cover.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
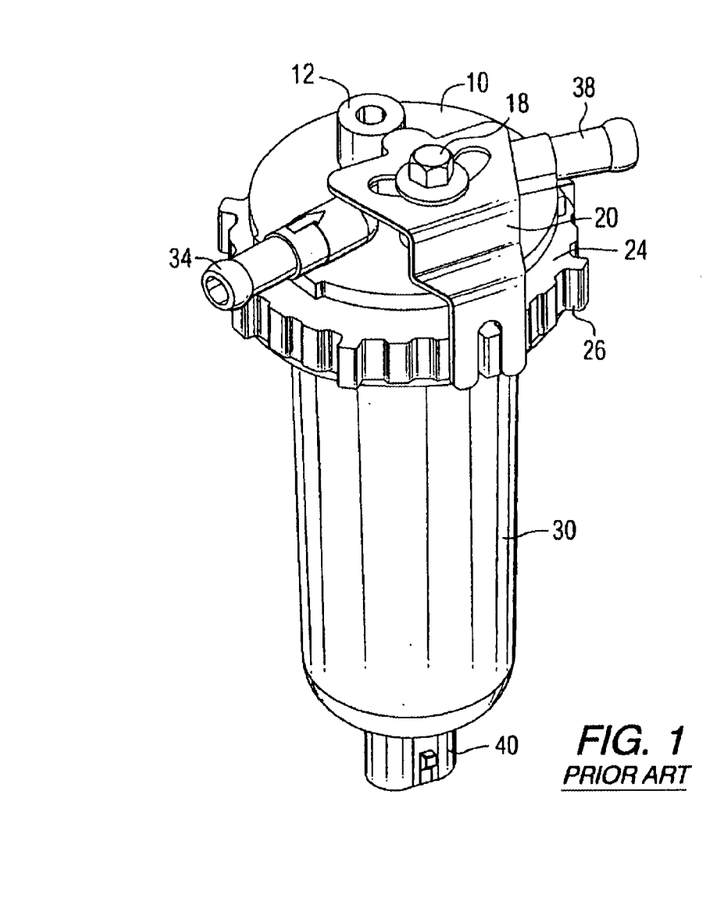
FIGS. 1 and 2 show a fuel filter mounting assembly that is generally known to those skilled in the art.

FIG. 1 shows a reservoir support structure that is generally known to those skilled in the art. A supporting cover 10 is provided with two posts extending from the supporting cover 10. One post 12 is used to attach the supporting cover 10 to an internal combustion engine or suitable bracket by attaching a bolt through the bracket and into the central opening of the post 12. A second post 14, which is not clearly visible in FIG. 1, but is shown in FIG. 2, is provided with a central opening into which a bolt 18 can be used to attach a latching structure 20 to the supporting cover 10.

Figure 2:
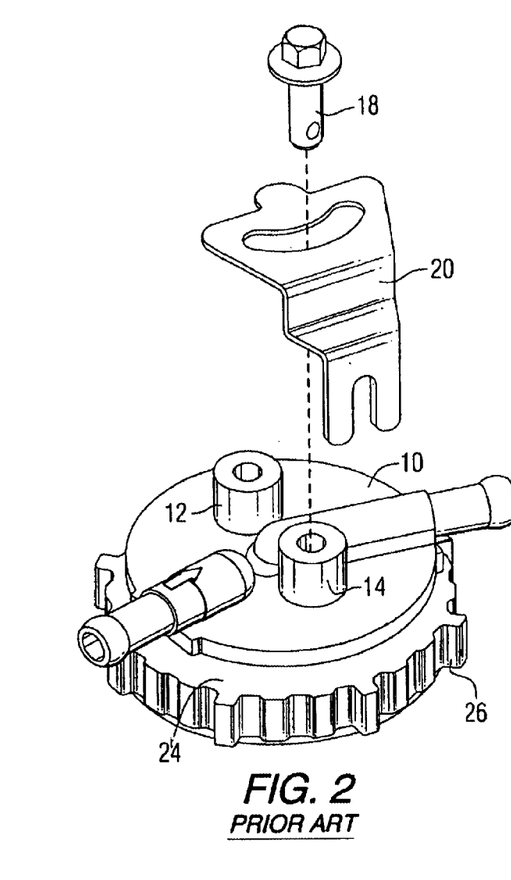

With reference to FIGS. 1 and 2, a collar 24 is threadedly engaged to the supporting cover 10 and is provided with a plurality of discontinuities 26 in its outer edge. A reservoir 30 extends through a central opening in the collar 24 and is retained in the position shown in FIG. 1 when the collar 24 is threaded onto the supporting cover 10. An inlet passage 34 and an outlet passage 38 provide conduits that allow the fuel system to conduct fuel into the reservoir 30 and out from the reservoir 30. A fuel filter (not shown in FIGS. 1 and 2) is disposed within the reservoir 30 and positioned so that the fuel flowing from the inlet passage 34 to the outlet passage 38 must pass through the filtering media of the fuel filter. A water detector 40 can be molded into the structure of the reservoir 30.

With reference to FIG. 2, it can be seen that the second post 14 is used to attach the latching mechanism 20 to the supporting cover 10. The first post 12 is used to attach the supporting cover 10 to a mounting bracket (not shown) that is attached either to an internal combustion engine component or to a convenient supporting structure associated with the engine.

Figure 3:
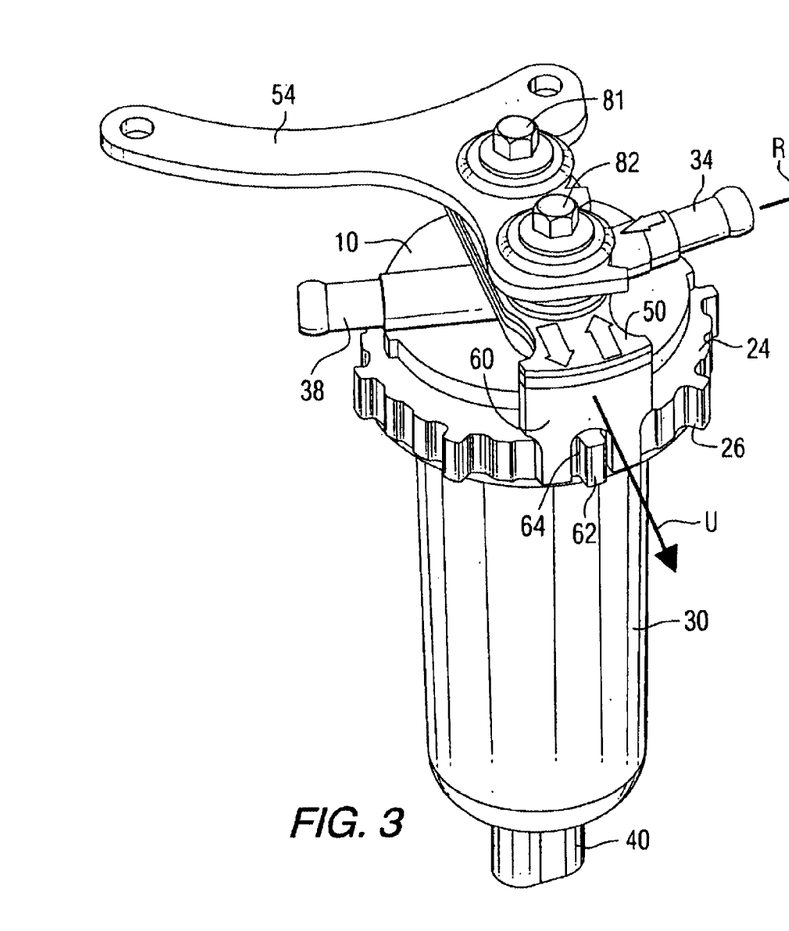
FIG. 3 is an isometric view of the present invention associated with a support bracket.

A reservoir support structure made in accordance with the preferred embodiment of the present invention is illustrated in FIG. 3. Comparing FIGS. 1 and 3, it can be seen that certain portions of the present invention utilize known components that are described above in conjunction with FIG. 1. For example, the reservoir 30 and the collar 24 operate in a manner that are generally similar to the operation of those components in conjunction with reservoir support structures, such as the ones described above in conjunction with FIGS. 1 and 2. Similarly, the function of the internal fuel filter located within the reservoir 30 is also similar. In addition, the shape of the collar 24 and its threaded relationship with the supporting cover 10 are also similar to those structures and relationships known to those skilled in the art. The major differences between the present invention and the prior art relate to the way in which the latch 50 is associated with the supporting cover 10 and in the way in which it operates to prevent removal of the reservoir 30 from its engagement with the supporting cover 10. The present invention also provides a support bracket 54 which is attached to the supporting cover 10 in a resilient way and in a way that allows the supporting cover to be removed from the support bracket 54 without the need for tools.

Figure 4:
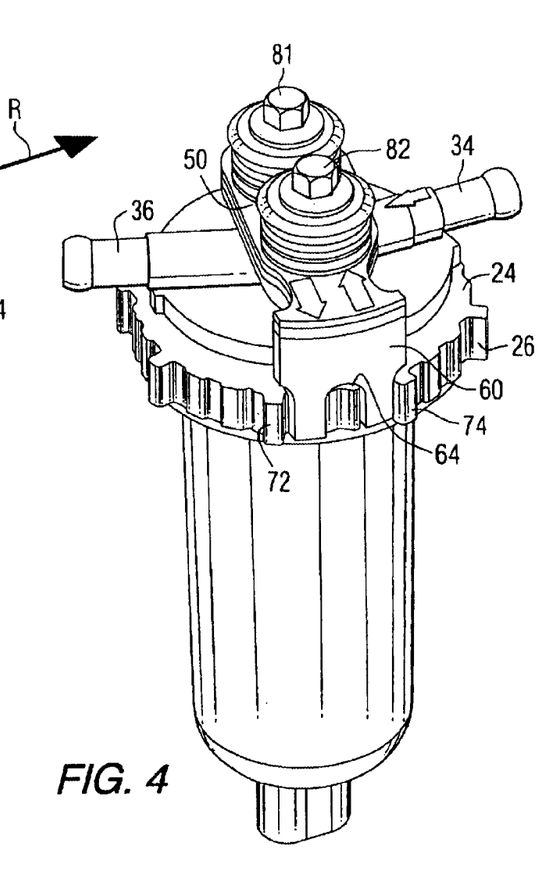
FIG. 4 is generally similar to FIG. 3, but the support bracket removed.

FIG. 4 illustrates the present invention with the support bracket 54 removed for clarity. With reference to FIGS. 3 and 4, the reservoir support structure of the present invention comprises a supporting cover 10 which is attachable to an object, such as an internal combustion engine. A collar 24 is attachable to the supporting cover 10 and is provided with a central opening (not shown in FIGS. 3 and 4) formed through it and shaped to receive the reservoir 30 therein. The reservoir 30 is shaped to pass downwardly through the central opening and is provided with an upper lip that prevents the reservoir 30 from passing entirely through the collar 24. In this way, when the collar 24 is threaded onto the supporting cover 10, the reservoir 30 is retained in a manner that is generally similar to fuel filter assemblies that are known to those skilled in the art. In a preferred embodiment, the collar 24 is attachable to the supporting cover 10 by rotating the cover 24 relative to the supporting cover 10. However, it should be understood that alternative attaching methods are also within the scope of the present invention if they require relative rotation between the collar 24 and the supporting cover 10. A protrusion extends from the supporting cover 10 and, in a preferred embodiment, comprises two posts. The posts are not clearly shown in FIGS. 3 and 4, but will be described below in greater detail. The latch 50 is attached to the supporting cover 10 and configured to slide relative to the protrusion, which comprises two posts in FIGS. 3 and 4. The latch is movable into a locking position (shown in FIGS. 3 and 4) and also movable into an unlocking position. Arrow U in FIG. 3 shows the direction of movement of the latch 50 that is required to move the latch into its unlocking position and away from the locking position shown in FIG. 3. When in the locking position, the latch 50 is shaped to inhibit rotation of the collar 24 relative to the supporting cover 10. As can be seen in FIG. 3, the latch comprises a locking portion 60 formed at one end of the latch. The locking portion is shaped to capture one (e.g. the one identified by reference numeral 62) of pluralities of discontinuities 26 within the interstitial gap 64 shaped in the locking portion 60. This one discontinuity 62 is captured in the interstitial gap 64 when the latch 50 is moved into the locking position, as shown in FIG. 3. The locking portion is also shaped to be captured between two adjacent one of the pluralities of discontinuities 26 when the latch 50 is in the locking position. This arrangement is shown in FIG. 4. In FIG. 4, the locking portion 60 is captured between discontinuities 72 and 74. These are two alternative relationships between the locking portion 60 and the plurality of discontinuities 26 that retain the collar 24 in a locked position when the latch 50 is moved into its locking position.

The latch 50 can be moved, in the direction represented by arrow U in FIG. 3, into an unlocking position. This moves the locking portion 60 and its interstitial gap 64 out of contact interfering with the plurality of discontinuities 26 and allows the collar 24 to freely rotate relative to the supporting cover 10. This, in turn, allows the collar to be unthreaded from the supporting structure 10 so that the reservoir 30 can be removed from the supporting structure.

With continued reference to FIGS. 3 and 4, it can be seen that two bolts, 81 and 82, extend downwardly through the latch 50 and into the two posts of the protrusion of the present invention. The relationship between the bolts, 81 and 82, the latch 50, the supporting cover 10, and other mounting components will be described in greater detail below in conjunction with FIG. 5.

Figure 5:
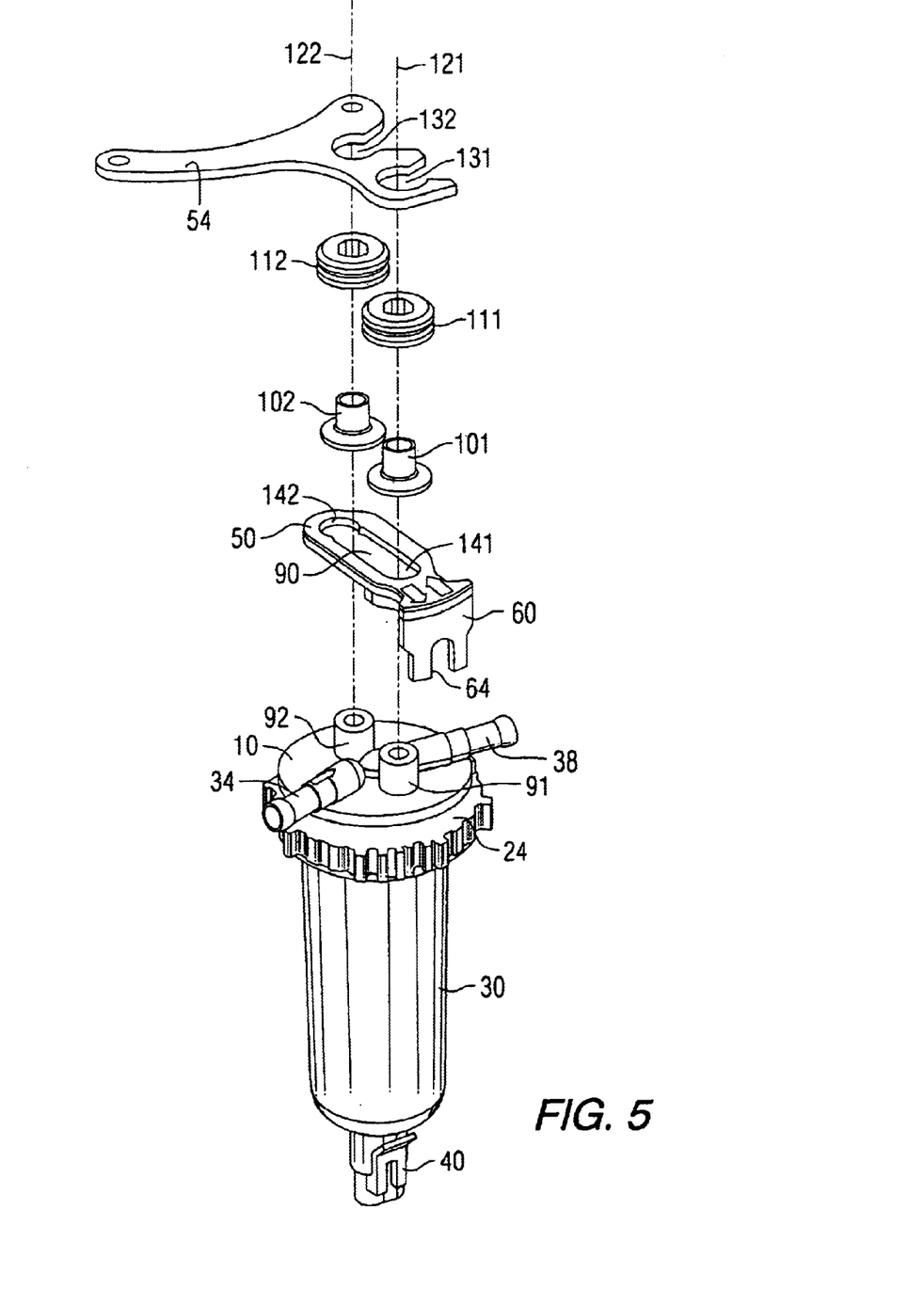
FIG. 5 is an isometric exploded view of the present invention.

FIG. 5 is an isometric exploded view of the present invention. The latch 50 comprises a slot 90 that is formed through its thickness. The slot is shaped to receive the protrusion therein. As described above, the protrusion comprises first and second posts, 91 and 92, that extend upwardly from the supporting cover 10. It should be understood that in alternative embodiments of the present invention the protrusion can comprise a single raised element that serves the purposes of the two posts, 91 and 92. With the latch 50 disposed with the protrusion extending through its slot 90, two spacer elements, 101 and 102, are located above the upper surface of the latch 50 and aligned with the two posts, 91 and 92, respectively. Two resilient members, 111 and 112, are aligned with the spacers, 101 and 102, and the upper cylindrical portions of the two spacers are inserted through the central openings of the resilient members, 111 and 112. The bolts, 81 and 82, are not illustrated in FIG. 5, but are described above in detail in conjunction with FIGS. 3 and 4. Those bolts extend downwardly, aligned with axes 121 and 122, and extend through the central openings of the resilient members, 111 and 112, the central openings of the spacers, 101 and 102, the slot 90 of the latch 50 and into the central threaded openings of the two posts, 91 and 92.

With continued reference to FIG. 5, two open-ended holes, 131 and 132, are formed through the support bracket 54. As will be described below, the support bracket and its open-ended holes are shaped to be received by the resilient members, 111 and 112, in a removable manner which does not require removal of the bolts, 81 and 82, to remove the supporting cover 10 and reservoir 30 from the support bracket 54.

With continued reference to FIG. 5, it can be seen that the slot 90 is shaped in such a way that the ends of the slot 90, identified by reference numerals 141 and 142, are shaped to be releasably restrained to either a first portion of the protrusion or a second portion of the protrusion. In the embodiment shown in FIG. 5, the first portion of the protrusion is post 91 and the second portion of the protrusion is post 92. The shapes of these ends, 141 and 142, of the slot 90 allow it to snap into position in either the locking position or unlocking position.

Figure 6:
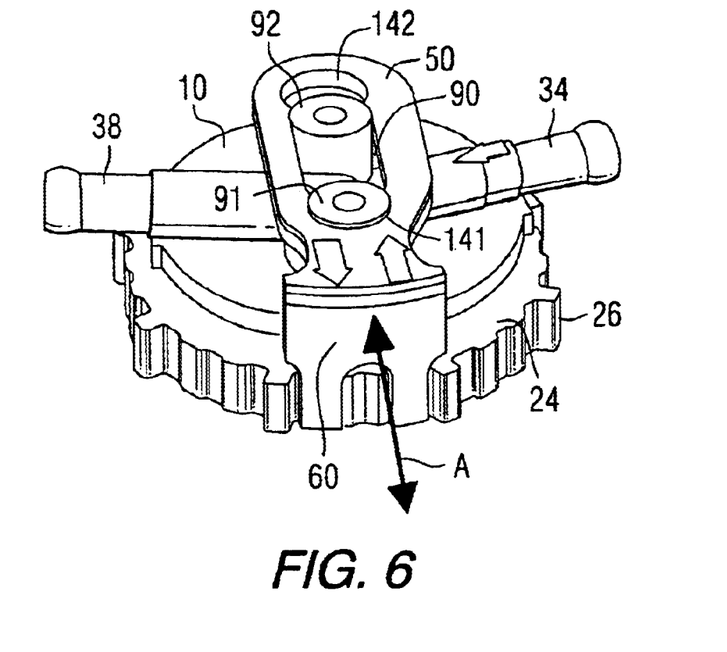
FIGS. 6 and 7 show two alternative locking positions of the present invention.
Figure 7:
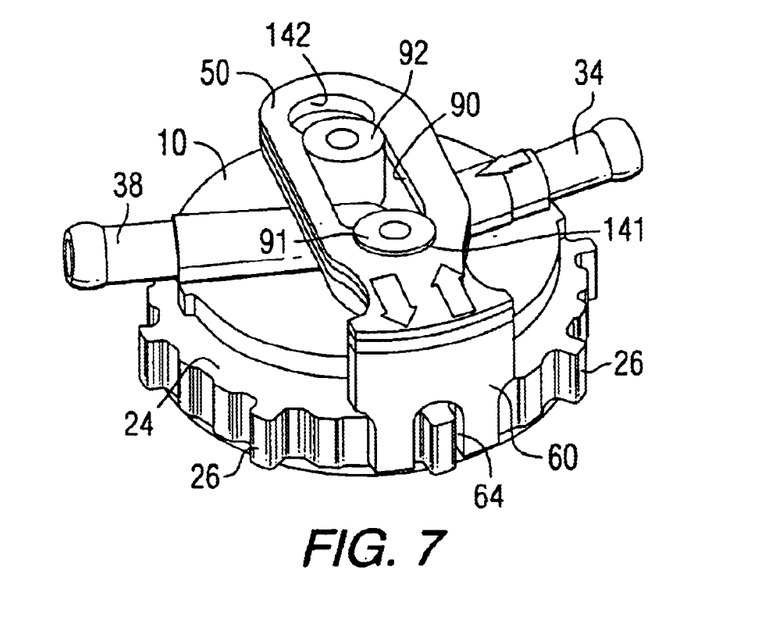

FIGS. 6 and 7 show the collar 24 threaded onto the supporting cover 10. It should be noted that the direction of the inlet and outlet passages, 34 and 38, relative to the latch 50 are not limiting. In other words, in a preferred embodiment of the present invention, the latch 50 can be reversed relative to the two posts, 91 and 92, without adversely affecting its operation. Furthermore, the directions of the inlet and outlet passages, 34 and 38, relative to the posts, 91 and 92, are also not limiting and the present invention can be used in association with either of these alternative configurations. This can be seen by comparing the relationships shown in FIGS. 6 and 7 to the relationship shown in FIG. 5.

With reference to FIGS. 6 and 7, it can be seen that the first end 141 of the slot 90 is located around post 91 to restrain the latch 50 in the position shown. The second end 142 has moved away from the other post 92. The latch 50 can move back and forth, as represented by arrow A, from a locking position (shown in FIG. 6) to an unlocking position by simply moving the latch 50 to engage post 92 in the second end 142. This can be seen, FIG. 6 shows the locking portion 60 captured between two adjacent ones of the plurality of discontinuities 26 while FIG. 7 shows the locking portion 60 positioned with its interstitial gap 64 to capture one of the plurality of discontinuities 26 within it. Either of these two arrangements, shown in FIGS. 6 and 7, will effectively retain the collar 24 in its rotational position relative to the supporting cover 10 when the latch 50 is in the locking position.

Figure 8:
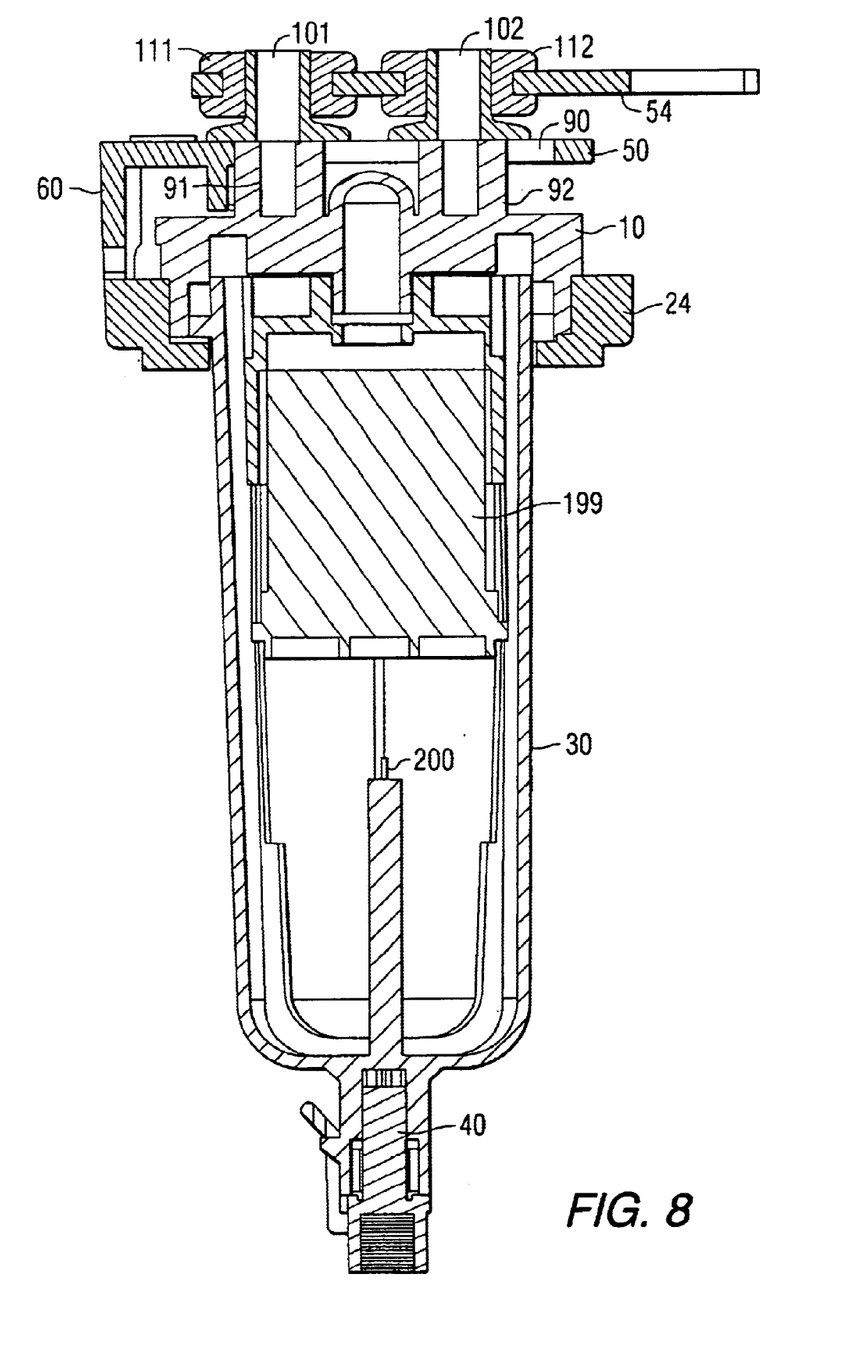
FIG. 8 is a section view of the present invention.

FIG. 8 is a section view taken through the two posts, 91 and 92, and through a central portion of the reservoir 30. A fuel filter 199 is shown disposed within the internal cavity of the reservoir 30. A water sensor 40, with electrodes 200, is located at the bottom portion of the reservoir 30 to detect the presence of water in that bottom portion. Typically, the fuel filter 199 can be a water separating fuel filter that results in a gradual buildup of water in the bottom portion of the reservoir 30.

With continued reference to FIG. 8, the collar 24 is shown threaded onto the supporting cover 10 which has the first and second posts, 91 and 92, which provide the protrusion of the present invention. The first and second posts extend upwardly into the slot 90 of the latch 50. The spacers, 101 and 102, are aligned with the posts, 91 and 92, and the resilient members, 111 and 112, are disposed around the tubular extensions of the spacers. It should be understood that the spacers, 101 and 102, transmit a downward force against the upper surfaces of the posts, 91 and 92, of the protrusions and do not transmit a downward force on the latch 50 that is sufficient to bind it in either the locking or unlocking positions. Also, the spacers, 101 and 102, and the resilient members, 111 and 112, are sized relative to each other so that tightening the bolts, 81 and 82, as illustrated in FIGS. 3 and 4 does not compress the resilient members sufficiently to bind the support bracket 54 in its illustrated position relative to the resilient members.

Although the two bolts, 81 and 82, are not illustrated in FIG. 8, it should be understood that the rigid attachment of the spacers, 101 and 102, to the upper surfaces of the post, 91 and 92, allows the latch 50 to move from its locking position shown in FIG. 8 to an unlocking position, wherein the latch 50 is moved toward the left in FIG. 8 to allow the collar 24 to rotate about the centerline of the collar 24. Also, it can be seen that the support bracket 54 is inserted into grooves in the outer periphery of the resilient members, 111 and 112, in such a way that the supporting cover 10 is resiliently supported by the support bracket 54 and is removable from the support bracket without the need to loosen the bolts, 81 and 82, as illustrated in FIGS. 3 and 4. Therefore, three advantages can readily be understood with particular reference to FIG. 8 and general reference to FIGS. 3–7. One important benefit of the present invention is that the reservoir 30 can be removed from the supporting cover 10 without the requirement that tools be used. No bolts need to be loosened in order to move the latch 50 into the unlocking position, unthread the collar 24 from the supporting cover 10, and lower the reservoir 30 away from the supporting cover. This can all be accomplished by simply manually sliding the latch 50 toward the left in FIG. 8 to move the locking portion 60 away from the plurality of discontinuities 26. A second important advantage of the present invention is that it provides a resilient mounting structure that isolates the reservoir 30 from vibrations that may be inherent in the object to which the support bracket 54 is attached. This is particularly true when the object is an internal combustion engine. The resilient members, 111 and 112, provide this vibration isolation. A third advantage of the present invention is that the supporting cover 10 can be removed from the support bracket 54 without the need to use tools. The bolts, 81 and 82, need not be loosened to permit the supporting cover 10 to be moved away from the support bracket 54, as described above in conjunction with FIG. 3 and particularly in relation to arrow R.

Figures 9, 10, 11:
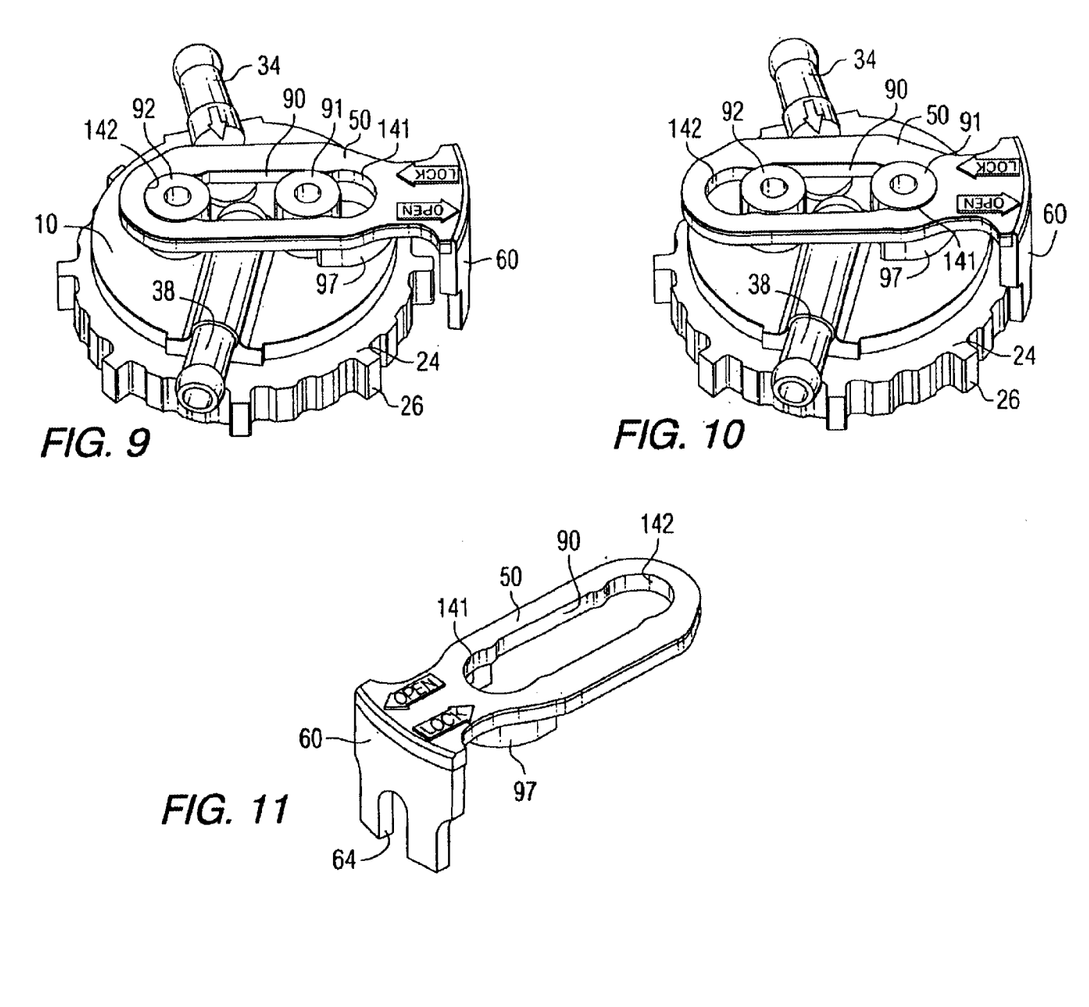
FIGS. 9 and 10 show the present invention in an unlocking position and a locking position, respectively.
FIG. 11 is an isometric of a latch of the present invention.

FIGS. 9 and 10 show the latch 50 in its unlocking position and locking position, respectively. In FIG. 9, the latch is moved toward the right to engage post 92 in the second end 142 of the slot 90. This releasably retains the latch 50 in the position shown in FIG. 9. As that movement engages the post 92 in the second end 142, it disengages post 91 from the first end 141, where it had been releasably retained when the latch 50 was in the locking position. The locking portion 60 of the latch 50 is shown moved toward the right relative to the plurality of discontinuities 26. This disengages the locking portion 60 from the discontinuities and allows the collar 24 to rotate relative to the supporting cover 10. FIG. 10 shows the latch 50 pushed toward the left to engage the first post 91 into the first end 141 so that it is releasably retained in the locking position. At the same time, the second post 92 was released from the second end 142 where it had been releasably retained when the latch 50 was in the unlocking position, as illustrated in FIG. 9.

FIG. 11 is an isometric view of the latch 50. It shows the locking portion 60 and interstitial gap 64 which are used to engage the discontinuities 26 by either causing the locking portion 60 to be captured between adjacent ones of the discontinuities or by causing a selected one of the discontinuities to be captured within interstitial gap 64. The first and second ends, 141 and 142, of slot 90 are shaped to snap onto their associated posts, 91 and 92, respectively, when the latch 50 is moved manually into the locking position and the unlocking positions, respectively. This allows the latch 50 to be releasably retained by the associated posts by which it is retained. These operations can all be performed manually and no tooling is necessary. The bolts, 81 and 82, that are described above need not be loosened for any of the operations of loosening the collar 24, removing the reservoir 30, or removing the supporting cover 10 from the support bracket 54.

With continued reference to FIG. 11, it can be seen that the latch 50 is provided with a downwardly extending spacer 97, which is formed as an integral part of the latch. In certain embodiments of the present invention, the downwardly extending spacer 97 is shaped to assure that the latch 50 remains at a preselected distance above the upper surface of the supporting cover 10 as it moves back and forth between the locking and unlocking positions. The downwardly extending spacer 97 also reduces potential wobble of the latch 50 as its slides back and forth between the locking and unlocking positions. Although the illustration in FIG. 11 illustrates only a single spacer 97 in the vicinity of the first end 141 of slot 90, it should be understood that other embodiments could provide spacers near both ends, 141 and 142, of slot 90 to assist in the smooth movement of the latch 50 between the locking and unlocking positions while also inhibiting the latch 50 is from wobbling as it moves between these positions. Although not a necessity in all embodiments of the present invention, the extension 97 is useful for these purposes. An additional extension, as discussed above, could also facilitate the maintenance of stability of the latch 50 as it moves back and forth relative to the first and second posts, 91 and 92, in the passage between the locking and unlocking positions.

Figure 12:
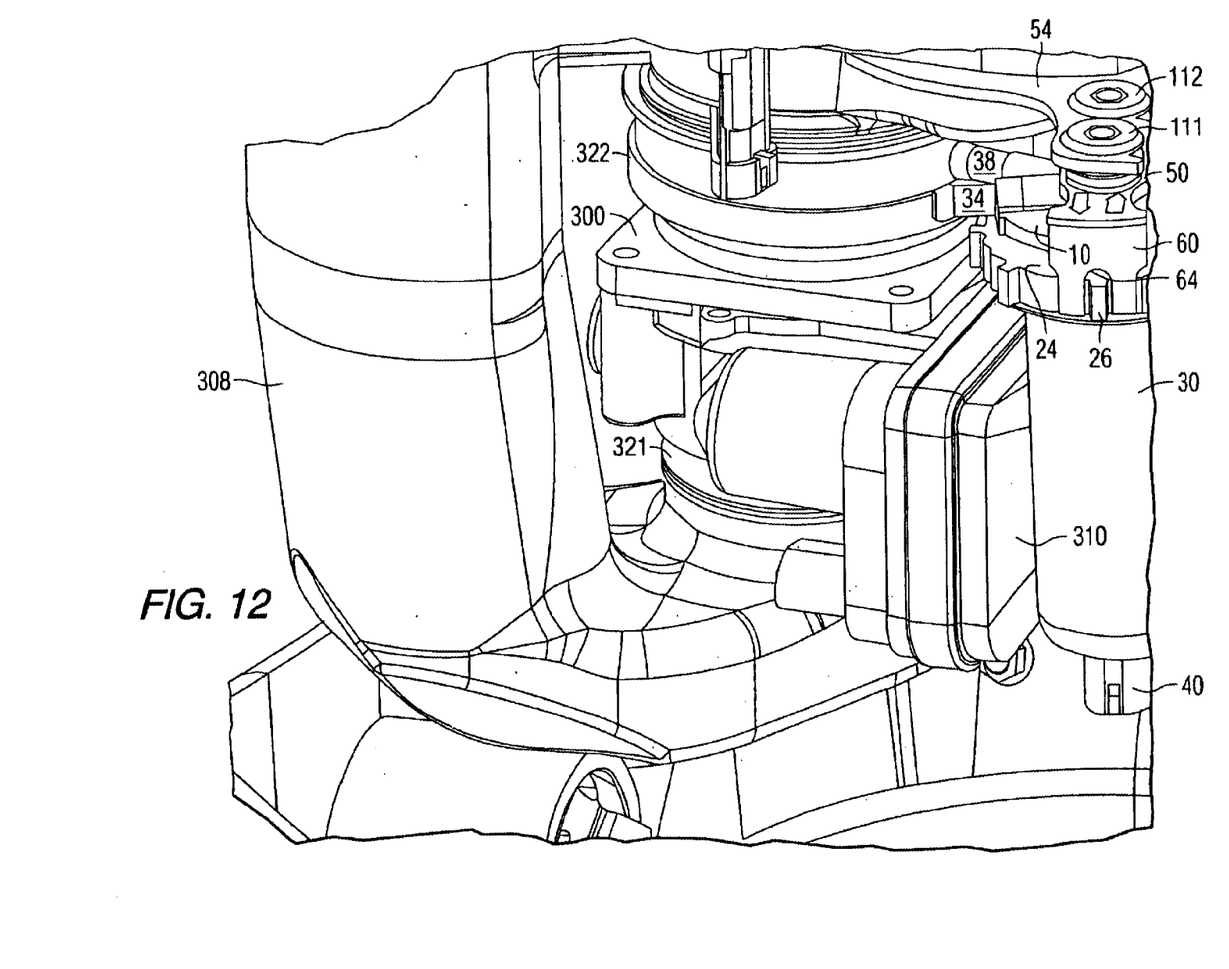
FIG. 12 shows a portion of an internal combustion engine with the present invention attached thereto.

FIG. 12 illustrates a torn away section of an internal combustion engine to show one possible mounting location where the present invention is used. In FIG. 12, a throttle body 300 is associated with an air inlet duct 308 to direct air through the throttle body 300. A throttle control device 310 controls the rotational position of a throttle plate located within the throttle body structure 300. In FIG. 12, air is directed upwardly through the throttle body 300 to the combustion chambers of an internal combustion engine and its related components. It should be understood that, for purposes of clarity of simplicity, not all components are illustrated in FIG. 12. For example, the fuel lines associated with the inlet and outlet passages, 34 and 38, are not connected to those conduits. In addition, the bolts, 81 and 82, are not shown. The purpose of FIG. 12 is to illustrate that the reservoir 30 can be easily and simply mounted to an internal combustion engine through the use of the present invention in such a way that all of its advantages can be realized.

Although the throttle body structure 300 is shown mounted between two resilient support structures, 321 and 322, it should be understood that the support bracket 54 does not directly benefit from the resilient mounting of the throttle body structure 300. Instead, the embodiment represented in FIG. 12 is hard mounted to a component of the engine which can experience severe vibration. The resilient members, 111 and 112, provide vibration isolation for the components of the fuel filter assembly. As described above, the supporting cover 10 and the reservoir 30 can be removed from the support bracket 54 by providing a force, toward the right in FIG. 12, to remove the resilient members, 111 and 112, from the associated open ended holes, 131 and 132, as described above in conjunction with FIG. 5. In addition, the latch 50 can be manually moved relative to the first and second posts to cause the latch 50 to be moved into an unlocking position. This allows the collar 24 to be rotated to remove the reservoir 30 from the supporting cover 10.

Although the present invention has been described in particular specificity and illustrated to show a preferred embodiment, it should be understood that alternative embodiments are also within its scope.

We claim:

1. A reservoir support structure, comprising:
a supporting cover which is attachable to an object;
a collar which is attachable to said supporting cover, said collar having a central opening formed through it and shaped to receive said reservoir therein, said collar being attachable to said supporting cover by rotating said collar relative to said supporting cover;
a protrusion extending from said supporting cover; and
a latch attached to said supporting cover and configured to slide relative to said protrusion, said latch being movable into a locking position and movable into an unlocking position, said latch being shaped to inhibit rotation of said collar relative to said supporting cover when said latch is in said locking position and to allow rotation of said collar relative to said supporting cover when said latch is in said unlocking position.

2. The reservoir support structure of claim 1, further comprising:
a support bracket which is attachable to said supporting cover and to said object for attaching said supporting cover to said object.

3. The reservoir support structure of claim 2, wherein:
said support bracket is resiliently attached to said supporting cover.

4. The reservoir support structure of claim 3, wherein:
said supporting cover is detachable from said support bracket by exerting a force on said supporting cover in a preselected direction away from said support bracket.

5. The reservoir support structure of claim 1, wherein:
said protrusion comprises two posts extending from said supporting cover.

6. The reservoir support structure of claim 1, wherein:
said latch comprises a slot formed through its thickness, said slot being shaped to receive said protrusion therein.

7. The reservoir support structure of claim 6, wherein:
said slot is shaped to be releasably restrained to a first portion of said protrusion when said latch is in said locking position, said slot being shaped to be releasably restrained to a second portion of said protrusion when said latch is in said unlocking position.

8. The reservoir support structure of claim 1, wherein:
said collar is shaped to have a plurality of discontinuities extending from its periphery.

9. The reservoir support structure of claim 8, further comprising:
said latch comprises a locking portion shaped to be captured between two adjacent ones of said plurality of discontinuities when said latch is in said locking position.

10. The reservoir support structure of claim 8, further comprising:
said latch comprises a locking portion shaped to capture one of said plurality of discontinuities within an interstitial gap of said locking portion when said latch is in said locking position.

11. The reservoir support structure of claim 1, wherein:
said reservoir is disposed within said central opening of said collar.

12. The reservoir support structure of claim 11, further comprising:
a fuel filter disposed within said reservoir.

13. The reservoir support structure of claim 11, further comprising:
a water sensor formed within the body of said reservoir.

14. The reservoir support structure of claim 1, further comprising:
an inlet passage formed in said supporting cover to conduct liquid fuel through said supporting cover; and
an outlet passage formed in said supporting cover to conduct liquid fuel through said supporting cover.

15. A fuel filter container, comprising:
a cover which is threaded;
a container shaped to receive a fuel filter therein;
a collar which is threaded for attachment in threaded association with said cover;
a protrusion extending from said cover in a direction away from said container;
a support bracket resiliently attached to said protrusion, said support bracket being attachable to an object for support;
a latch movably attached to said cover for movement between a locked position and an unlocked position, said collar being prevented from rotating relative to said cover when said latch is in said locked position, said collar being permitted to rotate relative to said cover when said latch is in said unlocked position.

16. The fuel filter container of claim 15, further comprising:
an inlet passage formed in said cover to conduct liquid fuel through said cover; and
an outlet passage formed in said cover to conduct liquid fuel through said cover.

17. The fuel filter container of claim 15, wherein:
said latch comprises a slot formed therein and a first end of said slot which is shaped to retain said protrusion when said latch is disposed in said locked position.

18. The fuel filter container of claim 15, wherein:
said cover is threaded with male threads and said collar is threaded with female threads.

19. The fuel filter container of claim 15, wherein:
said collar is shaped to receive said container through a central opening in said collar that is sized to prevent an open end of said contained from passing through said central opening.

20. The fuel filter container of claim 15, wherein:
said collar is shaped to have a plurality of discontinuities formed therein.

21. The fuel filter container of claim 20, wherein:
said latch comprises an interstitial gap which is shaped to capture one of said plurality of discontinuities therein when said latch is disposed in said locked position.

22. The fuel filter container of claim 20, wherein:
said latch is shaped to be captured between to adjacent ones of said plurality of discontinuities when said latch is disposed in said locked position.

23. The fuel filter container of claim 15, further comprising:
a second protrusion extending from said cover in a direction away from said container, said support bracket being resiliently attached to said support bracket.

24. The fuel filter container of claim 23, wherein:
said slot formed in said latch comprises a second end which is shaped to retain said second protrusion when said latch is disposed in said unlocked position.

25. The fuel filter container of claim 15, wherein:
said support bracket if held in attachment to said protrusion by friction and is removable by exertion of a force on said cover in a preselected direction.

26. The fuel filter container of claim 15, wherein:

said protrusion comprises two posts extending from said cover in a direction generally parallel to each other.

27. A reservoir support structure, comprising:

a supporting cover which is attachable to an object;

a collar which is attachable to said supporting cover, said collar having a central opening formed through it and shaped to receive said reservoir therein, said collar being attachable to said supporting cover by rotating said collar relative to said supporting cover;

a protrusion extending from said supporting cover;

a latch attached to said supporting cover and configured to slide relative to said protrusion, said latch being movable into a locking position and movable into an unlocking position, said latch being shaped to inhibit rotation of said collar relative to said supporting cover when said latch is in said locking position and to allow rotation of said collar relative to said supporting cover when said latch is in said unlocking position; and a support bracket which is attachable to said supporting cover and to said object for attaching said supporting cover to said object, said support bracket being resiliently attached to said supporting cover.

28. The reservoir support structure of claim 27, wherein:

said supporting cover is detachable from said support bracket by exerting a force on said supporting cover in a preselected direction away from said support bracket.

29. The reservoir support structure of claim 27, wherein:

said protrusion comprises two posts extending from said supporting cover.

30. The reservoir support structure of claim 29, wherein:

said latch comprises a slot formed through its thickness, said slot being shaped to receive said protrusion therein, said slot being shaped to be releasably restrained to a first portion of said protrusion when said latch is in said locking position, said slot being shaped to be releasably restrained to a second portion of said protrusion when said latch is in said unlocking position, said collar being shaped to have a plurality of discontinuities extending from its periphery, said latch comprising a locking portion shaped to be captured between two adjacent ones of said plurality of discontinuities when said latch is in said locking position, said locking portion being shaped to capture one of said plurality of discontinuities within an interstitial gap of said locking portion when said latch is in said locking position.

31. The reservoir support structure of claim 30, wherein:

said reservoir is disposed within said central opening of said collar, a fuel filter being disposed within said reservoir.

\* \* \* \* \*